United States Patent
Dalton et al.

(10) Patent No.: US 7,032,903 B1
(45) Date of Patent: Apr. 25, 2006

(54) BRUSH-SEAL DESIGNS FOR TURBINES AND SIMILAR ROTARY APPARATUS

(75) Inventors: Wiliam S. Dalton, Chesterfield, MA (US); Eric Sulda, Chicopee, MA (US); Patrick S. Dalton, Southampton, MA (US); William G. Catlow, Princeton, MA (US)

(73) Assignee: TurboCare, Inc., Chicopee, MA (US)

( * ) Notice: Subject to any disclaimer, the term of this patent is extended or adjusted under 35 U.S.C. 154(b) by 0 days.

(21) Appl. No.: 09/543,951

(22) Filed: Apr. 6, 2000

Related U.S. Application Data

(60) Provisional application No. 60/128,026, filed on Apr. 6, 1999.

(51) Int. Cl.
 *F01D 11/02* (2006.01)
(52) U.S. Cl. .................. 277/355; 277/413; 277/416
(58) Field of Classification Search ............... 277/355, 277/422, 416, 413, 421
 See application file for complete search history.

(56) References Cited

U.S. PATENT DOCUMENTS

| | | | |
|---|---|---|---|
| 2,863,632 A * | 12/1958 | Miller ..................... | 415/136 |
| 4,436,311 A * | 3/1984 | Brandon ................... | 277/413 |
| 4,971,336 A * | 11/1990 | Ferguson .................. | 277/355 |
| 5,395,124 A * | 3/1995 | Brandon ................... | 277/413 |
| 5,474,306 A * | 12/1995 | Bagepalli et al. ........... | 277/355 |
| 5,547,340 A * | 8/1996 | Dalton et al. ............. | 415/121.2 |
| 5,599,026 A * | 2/1997 | Sanders et al. ............. | 277/415 |
| 5,749,584 A * | 5/1998 | Skinner et al. ........... | 415/173.5 |
| 5,810,365 A * | 9/1998 | Brandon et al. ............ | 277/416 |
| 5,961,280 A * | 10/1999 | Turnquist ................ | 415/173.3 |
| 6,027,121 A * | 2/2000 | Cromer et al. ............. | 277/347 |
| 6,030,175 A * | 2/2000 | Bagepalli ................. | 415/173.3 |
| 6,257,586 B1 * | 7/2001 | Skinner et al. ............. | 277/303 |
| 6,318,728 B1 * | 11/2001 | Addis et al. ................ | 277/355 |

FOREIGN PATENT DOCUMENTS

| | | |
|---|---|---|
| EP | 0816627 A1 | 1/1998 |
| EP | 0911554 A1 | 4/1999 |
| EP | 0989342 A2 | 3/2000 |
| GB | 2301635 | * 12/1996 |

* cited by examiner

*Primary Examiner*—William L. Miller
(74) *Attorney, Agent, or Firm*—Bradley N. Ruben

(57) ABSTRACT

A seal segment for a turbine is provided having labyrinth teeth and a brush seal disposed along the labyrinth teeth. A plurality of the segments for a seal ring. The segments are separable from each other so that the seal can retract. Each segment has two ends, each of which abuts another segment, with those ends lying along along a radius (when looking down the shaft of the turbine). The brush disposed in each segment has ends that do not lie along a radius, but fit together in a tongue and groove configuration when the seal segments come together to form a seal.

9 Claims, 3 Drawing Sheets

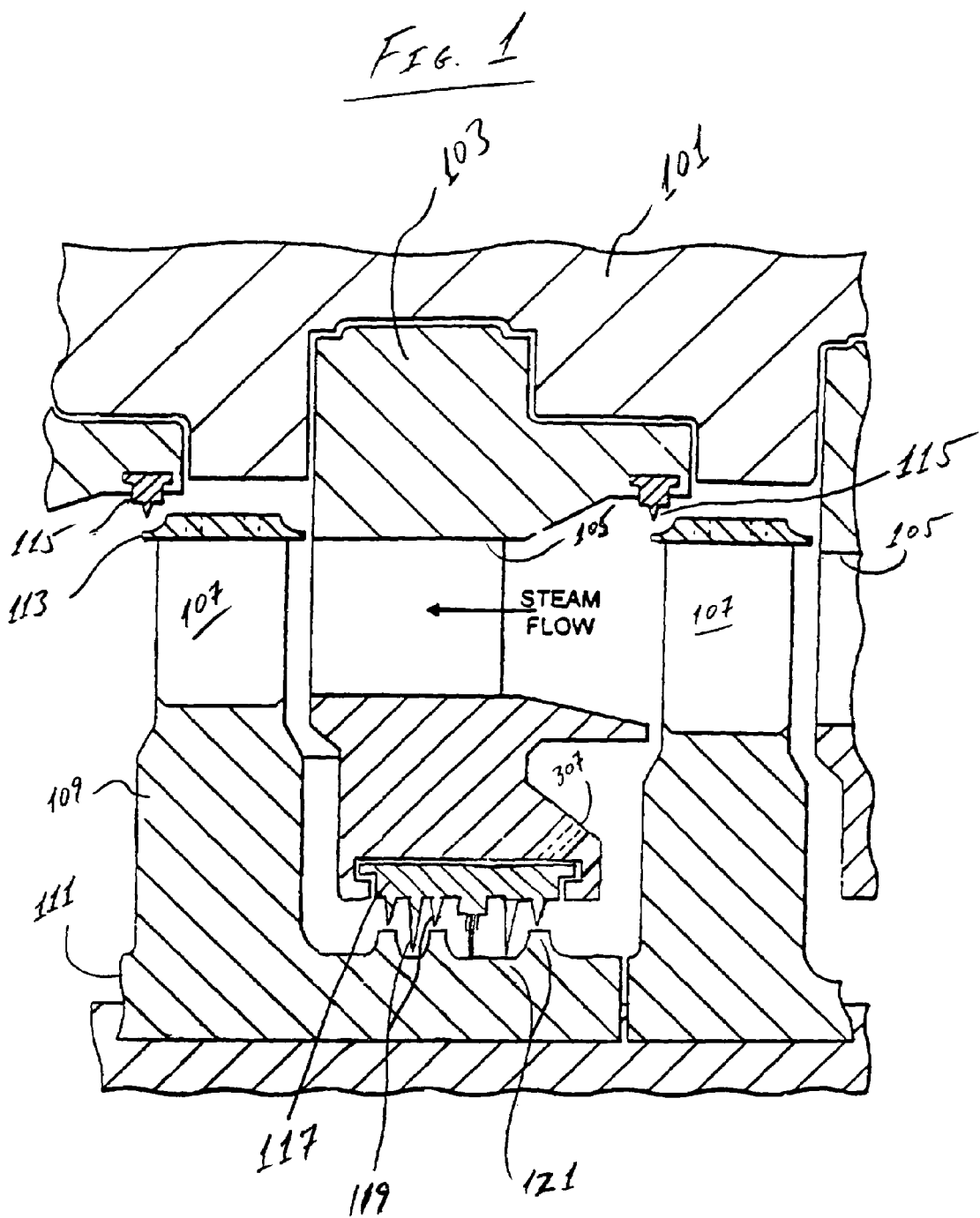

BRUSH-SEAL DESIGNS FOR TURBINES AND SIMILAR ROTARY APPARATUS

RELATED APPLICATIONS

This application is based on provisional application Ser. No. 60/128,026, filed Apr. 06, 1999.

BACKGROUND OF INVENTION

1. Field of Invention

The present invention relates generally to improved brush seal designs for use in turbines such as steam and gas turbines and other apparatus that extracts work from the expansion of a working fluid.

2. Brief Description Of The Prior Art

The use of axial flow elastic fluid turbines, such as axial flow steam turbines, plays a very important role in the production of electric power in our society. Often, in a typical power plant, there will be a number of steam turbines each driving one or more electrical power generators.

In general, each steam turbine comprises a rotatable shaft supported by bearings which are encased in a housing or casing. In order to rotate the rotor shaft using the momentum of superheated vapor (superheated steam for a steam turbine and hydrocarbon combustion gases for a "gas" turbine), a series of turbine stages are sequentially arranged along the axis of the shaft. A boiler, typically located external to the turbine casing, is provided for the purpose of generating steam for powering the turbine. External to the turbine casing are steam pipes which are used to conduct the steam from the boiler to the turbine. Turbines are typically classified by the pressure or pressure range at which the operate. Attached to the end of the turbine casing is a narrowing casing called a shroud. At the end of the shroud is a pipe (the snout pipe) that joins to the pipe from the boiler; sealing of the snout pipe to the steam supply pipe is effected by sealing rings called snout rings; the snout rings comprise two sets of rings that intermesh, one set disposed on the outside of the snout pipe and the other on the inside of the steam pipe into which the snout pipe leads. An example of this type of expansion joint is shown by Miller in U.S. Pat. No. 2,863,632 (the disclosure of which is incorporated herein by reference).

Each pressure stage of the turbine has a turbine rotor. Each rotor has a plurality of blades which radially extend a predetermined distance from the shaft, towards a circumferentially extending shroud band (i.e., cover) that is secured to the tenon portions of the blades. A stationary diaphragm is installed behind each rotor in a circumferential joint formed in the turbine casing. The inner structure of the diaphragm defines a ring of steam nozzles disposed circumferentially around the rotor. These nozzles are located at the same radial position as the blades in its associated rotor. The nozzles channel the steam (or other working fluid) entering that stage and channel it to the blades. To establish a "tip seal" with the shroud band of each turbine rotor, a ring of spillstrips segments are supported from the stationary diaphragm in each stage with packing that extends to the rotating shroud band (the band being attached to the blades, which are fixed to the rotor, which is rotating). As the steam travels through the turbine, a portion of its linear momentum is transformed into the angular momentum of the rotor blades at each turbine stage, thereby imparting torque to the turbine shaft. At downstream stages it is often necessary to increase the length of the rotor blades and the size of the associated diaphragms in order to extract kinetic energy from working fluid at a reduced pressure.

A major problem in turbine design relates to the quality of steam seals between the various stationary and rotating components along the steam flow path in the turbine. In general, there are several locations within the turbine where such seals must be established to ensure high turbine efficiency.

A first location where steam seals are required is between the outer portion of each rotor and its associated diaphragm have been effected using a segmented spillstrip ring of the type disclosed in U.S. Pat. No. 5,547,340, incorporated herein by reference. During start-up operations, when the rotor exhibits low frequency modes of operation about its axis, the tips of the rigid fin-like structure (e.g., fin seals) projecting along the spillstrip segments tend to rub against and/or cut into the shroud-band of the associated rotor, causing damage thereto during the start-up process. The only safeguards offered against such rubbing action has been to design the spillstrips so sufficient clearance exists between the tip portions of the fins on the spillstrips and the shroud band of the rotor. This approach, however, results in degradation of the tip seal, allowing steam to pass through the clearance area and not through and over the blades of the rotor, thereby reducing the performance of the turbine.

A second location where steam seals are required is between the rotor and the turbine shaft. Creating seals over such regions has been addressed generally over the years by installing a segmented packing between the rotor and the turbine shaft at each turbine stage. The packing typically consists of a first ring structure with multiple rows of fins (i.e., seal teeth) on one of the parts and a second structure with multiple rows of surface projections that correspond to the fins. The first ring structure typically is mounted from the associated diaphragm and the second ring structure typically is mounted to the turbine shaft. Together, the corresponding and registered rows of fins and projection structures create a labyrinth-type seal which presents a high impedance flow path to pressurized steam. However, during start up operation, low frequency modes of operation about the turbine axis tends to cause the tip portions of each row of fins to move radially outwardly and inwardly; in addition, differential thermal expansion caused as the hot working fluid is admitted to the stages and each heats up to operating temperature can exacerbate damage to the packing. To avoid rubbing and damage to such packing ring structures, it is necessary to design the fins and surface projections with sufficient clearance to avoid tip rubbing during start-up operation. This, however, necessarily degrades the quality of the labyrinth seal.

In U.S. Pat. Nos. 4,436,311 and 5,395,124 to Brandon (the disclosures of which are incorporated herein by reference), the problem of fin tip rubbing in packing ring design has been addressed by providing a retractable segmented packing ring structure between each rotor and turbine shaft. The manner in which the quality of the labyrinth seal is improved with this design is described as follows. During startup operation, when low frequency rotor vibration is predominant, the diaphragm-mounted packing ring segments are spring-biased in a radial direction away from the turbine shaft, reducing the risk of fin-tip portion rubbing and packing ring damage. As the rotor increases its angular speed, low frequency vibration is naturally reduced. The ring segments of the packing are forced to move closer (radially inward) to the turbine shaft by steam pressure, improving the quality of the labyrinth seal between the fins and the opposing corresponding surface projections, thereby improving the efficiency of the turbine.

An alternative solution to the problem of fin tip rubbing in packing is disclosed in UK Patent Application Publication No. GB 2 301 635 A. In this UK Patent Publication, a brush-type element is installed between a pair of fins extending from the packing ring segments mounted on the diaphragm. The function of the brush seal is to improve the quality of the labyrinth seal during all phases of operation. A major shortcoming with this design, however, is that during startup operations it does not provide a way of protecting the tips portions of the fin seals without designing a high degree of clearance into the design. Consequently, by virtue of such increased clearance requirements, the quality of the labyrinth seal provided by this prior art packing seal design is necessarily compromised.

Various other patents describe the use of brush seals in turbines, such as Ferguson in U.S. Pat. No. 4,971,336, Sanders et al. in U.S. Pat. No. 5,599,026, Bagepalli et al. in U.S. Pat. No. 5,474,306, and Skinner et al. in U.S. Pat. No. 5,749,584 (the disclosures of which are incorporated herein by reference). In these designs, the brush seals are designed to be fixed and immovable. Many of th more recent brush seal designs provide the brushes canted at an angle from the radius of the turbine (the center being defined by the rotating turbine shaft). As Skinner et al. teach, existing machines with retractable seals (e.g., as described by Brandon) can not be retrofit with a brush seal having canted bristles substituted for one of the labyrinth teeth while maintaining a 360° array of bristles about the seal, or when used with retractable packing Skinner et al. teach that the ends of each brush seal disposed in a retractable packing segment must be cut along the radius to provide each of the segments with a flush surface for proper mating when the seals engage each other to form the ring structure but due to the cant of the bristles relative to the flat end of the brush seal segment disposed along the radius, the Skinner et al. design includes a small gap in the brush seal where the bristles are cut along the radius of one segment end.

OBJECTS AND SUMMARY OF THE INVENTION

A primary object of the present invention to provide an improved brush-seal design for use in creating high seals in turbines while avoiding the shortcomings and drawbacks of prior art brush-seal designs.

Another object of the present invention is to provide such a brush-seal design which effectively reduces turbine part wear while providing an improved seals between each stage of the turbine by accommodating for transient radial deflections of the turbine rotor and shaft during startup operation.

Another object of the present invention is to provide an improved segmented packing ring for use in an elastic turbine, wherein an improved seal is provided between the packing ring holder and rotor thereof.

Yet another object of the present invention is to provide an improved retractable packing for use in an elastic turbine, wherein an improved seal is formed between the retractable packing and the turbine rotor by way of fins and at least one row of bristle elements (i.e., a brush seal) disposed therebetween.

A further object of this invention is to provide a retractable brush seal packing that provides a continuous brush seal without gaps as shown in prior art with brush seals on the retractable packing.

These and other objects of the present invention will become apparent hereinafter.

BRIEF DESCRIPTION OF THE DRAWINGS

For a more complete understanding of the Objects of the Present Invention, the following Detailed Description of the Illustrative Embodiment should be read in conjunction with the accompanying drawings, in which:

FIG. 1 is a cross-sectional view of a conventional turbine stage including an embodiment of the novel packing of this invention.

DETAILED DESCRIPTION OF PREFERRED EMBODIMENTS

Figure 2A:
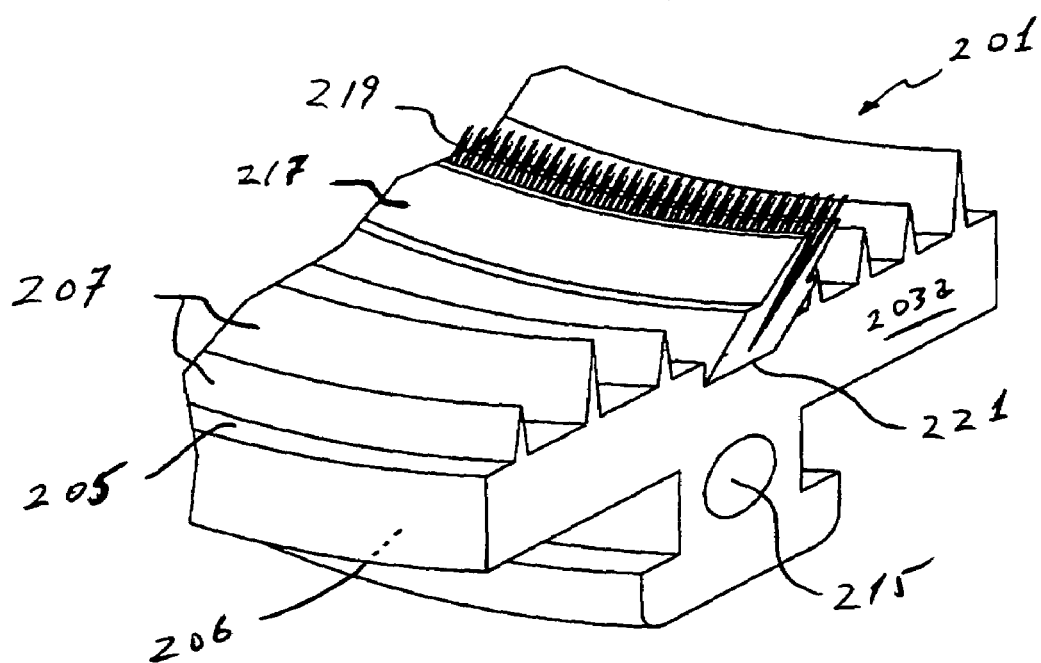
FIGS. 2A and 2B are perspective views of opposite ends of a packing segment.

The reader is first referred to the above-mentioned patents in the Background section for specifics and details regarding labyrinth seals and retractable packing segments. As noted in the Background section, the steam (exemplified in this section as the working fluid) is channeled in each stage by a nozzle in the diaphragm to the blades, the diaphragm being attached to the non-moving casing and the blades being attached to the rotating shaft of the turbine.

As shown in FIG. 1, a cross-section through a turbine reveals the casing 101 in which is mounted a diaphragm 103 separating adjacent stages. Steam flow from the previous stage is channeled through the nozzle (a shaped opening) 105 in the diaphragm to impinge on the turbine blades 107. Each blade is attached by a root 109 to the turbine shaft 111. The circumference at the end of the blades is capped by a circumferential shroud 113. Steam is prevented from by-passing the blade and going over the shroud by a tip seal 115; the steam does not flow backward between the tip seal and the shroud because it cannot flow from a lower pressure area to a higher pressure area (areas to the left in FIG. 1 being of lower pressure than those to the right). A corresponding tip seal 115 is present on the next downstream stage of blades. While steam cannot avoid the nozzle by escaping back through seal 115 (i.e., to the right in the Figure), it can leak between the diaphragm and the shaft. Accordingly, this is another location where packing is used. In review, steam from a previous stage impinges on the blade and is directed to the next stage, a nozzle in the diaphragm directed at the next set of blades. The steam entering the stage must be prevented from escaping around the diaphragm with the nozzle; it is prevented from going back upstream due to higher pressures, from going around the shaft by the packing 117 adjacent the shaft, and from bypassing the blade by the tip seal 115.

The packing between the diaphragm and the shaft is preferably retractable and is preferably of the labyrinth type. The packing 117 is disposed in the diaphragm and it includes a series of fins 119 the ends of which lie adjacent corresponding lans 121 of the shaft, some of which are raised, all providing the proper clearance and a tortious (labyrinthine) path of high resistance, and hence a seal. The packing can be biased towards the shaft with a spring. The packing is in the geometry of a ring and preferably is provided as a plurality of segments, typically six being used in a high pressure application. By virtue of this packing, the steam exiting from the previous stage's blades is channeled through the nozzle and does not escape around the diaphragm. It should be appreciated that a labyrinth seal need not have solid fins in order to provide a labyrinth. For example, one or more of the fins can be replace by a brush seal, or the entire inner surface where the fins are disposed can be a brush. In both of these eases, a tortious flow path is established, hence a labyrinth seal is formed.

Figure 2B:
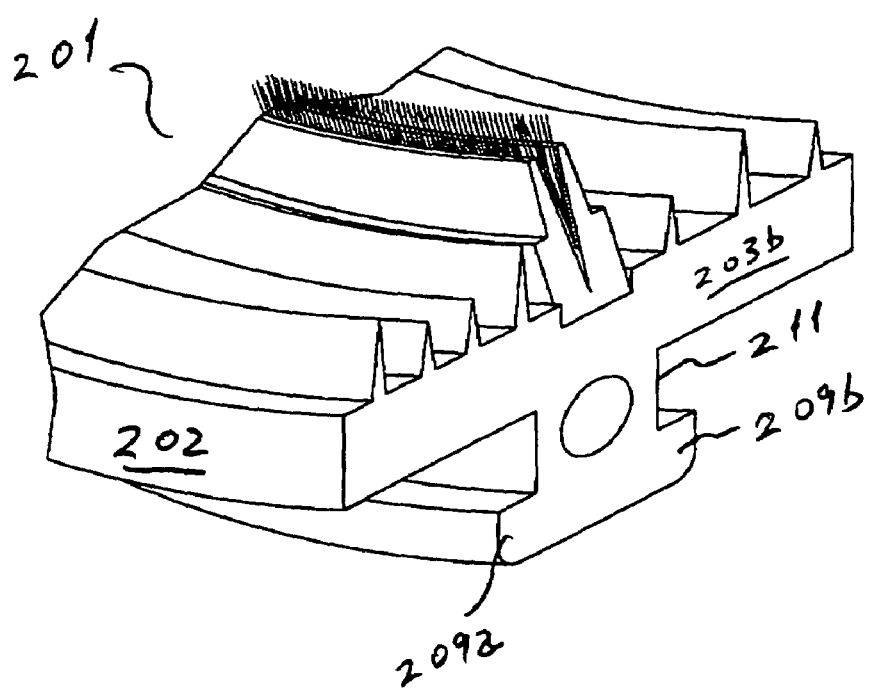

The retractable packing segments are arcuate. Perspective views of opposite ends of a segment are shown in FIGS. 2A and 2B. Each segment 201 has a main body 202 with ends 203a and 203b that are preferably parallel with the axial radius of the turbine (i.e., the radius of the turbine in a cross-section when view axially along the shaft), although they need not be. The radially inner surface 205 of the segment (i.e., the side facing the shaft) is provided with a plurality of fins 207 that can be of the same or of different heights from the inner surface. The radially outer surface 206 preferably has a T-shaped extension defining opposing shoulders 209a/209b that engage a correspondingly shaped groove in the diaphragm as shown in FIG. 1. The neck 211 portion connecting the radially outer surface of the packing segment to the shoulders receives a corresponding projection from the diaphragm. The neck at each end of the segment preferably is provided with a bore 215. A spring (or similar means) is received in each of the bores in adjacent/abutting segments; the springs bias the segments away from each other. As noted above, it is preferred that these segments include means for allowing steam behind the seal, as will be discussed below; as the turbine reaches operating pressure, the pressure forces the necks of the segments to abut the corresponding projection in the diaphragm and to form a seal so that the steam must pass through the nozzle or attempt to traverse the labyrinth seal.

In the embodiment shown in FIGS. 2A and 2B, a center section of the segment where a fin could be provided has been replaced by a brush seal. The seal generally comprises a holder 217 in which are disposed a multiplicity of bristles 219. As shown, and as described in the art, the bristles are preferably canted (angled) with respect to the (axial) radius of the turbine. We have discovered that the alleged problem identified by Skinner et al., that the ends of the brush seals, like the packing segment ends, must be disposed along the radius of the turbine, is not a limitation. As shown in FIGS. 2A and 2B, at one end of the segment the brush seal is cut at an angle that extends past the end of the segment (e.g., FIG. 2A) and the other end of the brush seal at the opposite end of that segment is cut at an angle that extends over the segment (e.g., FIG. 2B). Thus, the ends of the brush seal are not disposed along the radius of the turbine. It is preferred that the end of the brush seal is cut so that the bottom (or outer) face 221 of the holder is essentially coincidental with the junction between the inner face 205 and the segment end 203a/b.

This invention provides a significant advantage over the system described by Skinner et al. because the present brush seal does not have areas where bristles are not present. In this industry, the seal formed by a brush seal typically is determined with respect to a theoretical fin in a labyrinth seal. Because a brush seal is not solid, some flow occurs through it, even when the brush is in line contact with the shaft. A pressure test is done to determine the leakage of a brush seal in line contact. This leakage value is then used to back-calculate the clearance between a theoretical fin in a labyrinth seal; that is, given the pressure drop in the test, the area between the end of the fin and the shaft is back-calculated (the fin is solid so no working fluid flows though it) to provide an effective leakage area for the brush seal. If one were to assume the same effective leakage area for the brush seal per se described by Skinner et al. and those of the present invention, adding the spaces formed by the missing bristles in the Skinner et al. seal results in a leakage area in Skinner et al.'s seal significantly greater than for the present seal. The leakage area is related to the diameter of the seal. Using a 36" diameter brush seal, the Skinner et al. brush seal has a 47% greater leakage than the present brush seal, and with a 10" diameter brush seal the present seal has 264% less leakage.

Figure 3:
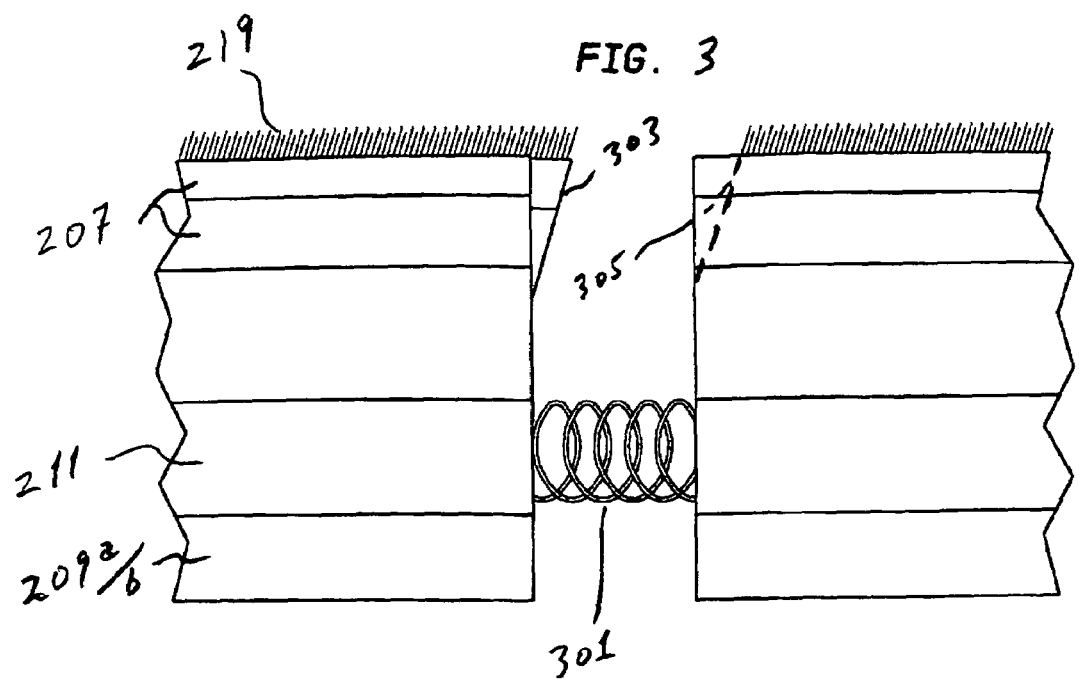
FIG. 3 is a side view showing adjacent packing segments separated from each other.

In transient operation during start-up, the segments are retracted and biased radially outward; this allows the shaft to rotate slowly with some wobble or vibration without the projections 121 on the shaft impacting and damaging the fins on the packing. As the steam pressure increases and the turbine comes up to operating speed and temperature, the packing contracts around the shaft. As shown in FIG. 3, adjacent packing segments are separated and are urged apart by a spring 301 (a coiled spring being shown in the figure). At the end of one brush seal, the seal is cut at an angle extending past the end of the segment to provide a sort of tongue 303. The corresponding end of the adjacent segment is provided with the brush seal cut at an angle extending over the surface of the segment to provide a groove 305. As the segment come together to form a ring, the opposing ends of the adjacent segments meet and become flush, and the tongue portion of the brush seal segment from one packing segment engages with the groove in the adjacent abutting segment. Thus, this invention avoids the problem inherent in the Skinner et al. device wherein a small hole or space exists in the brush seal at each joint between packing segments. Additionally, the brush seal (or one of plural brush seals) can be provided as a floating brush seal.

Figure 4:
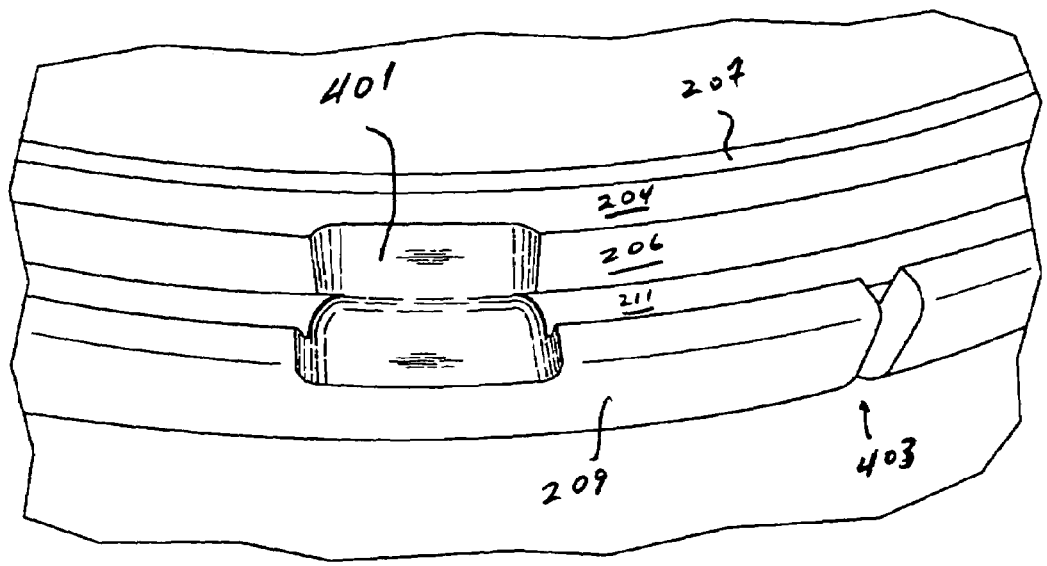
FIG. 4 is a perspective view of a notch in the side of a packing segment to allow steam to enter behind the packing during start-up and shut down.

Further regarding transient operation, as noted above during start-up there are often issues with thermal gradients and mismatched expansion and alignment as well as vibration problems. To avoid damage to the packing, it is desirable effectively to disengage the packing from the shaft. Accordingly, retractable-contractible packing as described by Brandon in U.S. Pat. No. 4,436,311 (the disclosure of which is incorporated herein by reference) is preferred; in essence, this packing is radially-movable and self-adjusting. This packing comprises a ring of packing segments each separated from those adjacent by a spring, which urges the ring to a larger circumference and hence away from the turbine shaft; the bottom segments in the ring naturally move away from the shaft due to gravity. In order to force the segments towards the shaft, the working fluid (steam) is provided access to the upstream radially outer surface of the segment; such access can be provided as a hole 307 in the wall of the diaphragm as shown in FIG. 1, so that the steam is freely admitted behind the packing. Alternatively, or additionally, as shown in FIG. 4, a groove or channel 401 or other conduit means can be provided in the radially outer surface 206, the neck 211, and one of the shoulders 209 of the segment effective to allow the working fluid to enter behind the outer surface and to force the segment towards the shaft. The shoulder portion of the T-shaped extension on the outer surface of the segment shown in FIG. 4 also can be provided with a groove or slit 403 perpendicular to the arc circumference of the segment for receiving a (leaf) spring or registration for further biasing and/or aligning the segment. In operation, when the turbine is down and steam is admitted to bring the turbine up to speed, the springs in the ends of the segments urge the ring of segments to a larger diameter and thus away from the shaft. As so biased, there will be spaces between the segments, and those spaces and/or the aforementioned channel allow steam behind the segment associated with a particular diaphragm, as the steam pressure increases, forcing the ring diameter smaller to seal about the shaft.

The foregoing description is meant to be illustrative and not limiting. Various changes, modifications, and additions may become apparent to the skilled artisan upon a perusal of this specification, and such are meant to be within the scope and spirit of the invention as defined by the claims.

What is claimed is:

1. A retractable packing segment for an apparatus that extracts work from the expansion of a gaseous working fluid, said apparatus comprising:
   a rotating shaft disposed in a casing,
   wherein a plurality of packing segments are disposed in a ring and centered on an axis defined by said shaft to provide a seal therearound,
   each said packing segment being retractable and comprising:
      an inner face for sealing against said shaft and an outer face supporting a T-shaped extension, said inner and outer faces and said extension spanning opposing common side ends, said common side ends cut parallel with radii of said axis; and
      at least one brush seal disposed on the inner face of said segment, said brush seal having opposing ends, at least one of said ends cut non-parallel with radii of said axis and extending past one of said common side ends, and bristles of said brush disposed at approximately the same non-parallel direction, wherein said plurality of packing segments provide a continuous 360° brush seal around said shaft.

2. The packing segment of claim 1, wherein both ends of said brush seal are cut non-parallel with radii of said axis.

3. The packing segment of claim 1, said inner face further comprising a plurality of fins.

4. The packing segment of claim 3, wherein the fins extend different distances from the inner face.

5. The packing segment of claim 1, said inner face comprising a plurality of brush seals.

6. A retractable brush seal for an apparatus that extracts work from the expansion of a gaseous working fluid, said apparatus comprising:
   a rotating shaft disposed in a casing,
   said brush seal in the geometry of a ring formed from a plurality of adjacent abutting packing segments and centered on an axis defined by said shaft to provide a brush seal therearound,
   each said segment being retractable and comprising:
      an inner face for sealing against said shaft and an outer face supporting a T-shaped extension, said inner and outer faces and said extension spanning opposing common side ends, said common side ends cut parallel with radii of said axis; and;
      at least one brush seal disposed on the inner face of said segment, said brush seal having opposing side ends cut non-parallel with radii of said axis, with bristles disposed at essentially the same non-parallel direction, one of said side ends cut angled to form a tongue extending past the segment common side end and the other of said brush seal ends cut at the same angle relative to said segment to provide a groove inset from the common side end for accepting a tongue formed by a brush seal on an adjacent packing segment, wherein a plurality of segments provide an continuous 360° brush seal ring around said shaft.

7. The brush seal of claim 6, said inner face further comprising a plurality of fins.

8. The brush seal of claim 7, wherein the fins extend different distances from the inner face.

9. The brush seal of claim 6, said inner face comprising a plurality of brush seals.

* * * * *